United States Patent [19]
Fukae

[11] Patent Number: 4,757,513
[45] Date of Patent: Jul. 12, 1988

[54] MULTI-FACETED REFLECTOR FOR USE IN PUMPING SLAB GEOMETRY SOLID STATE LASERS

[75] Inventor: Kenneth A. Fukae, Irvine, Calif.
[73] Assignee: Amada Engineering & Service Co., Inc., La Mirada, Calif.
[21] Appl. No.: 888,015
[22] Filed: Jul. 22, 1986
[51] Int. Cl.[4] .............................................. H01S 3/08
[52] U.S. Cl. ....................................... 372/99; 372/72; 372/61; 372/92
[58] Field of Search ....................... 372/92, 99, 72, 98, 372/107, 71, 108

[56] References Cited
U.S. PATENT DOCUMENTS
4,641,315 2/1987 Draggoo .............................. 372/99
4,682,338 7/1987 Kuppenheimer, Jr. ............... 372/72

OTHER PUBLICATIONS
Siegrist, "Cusp Shape Reflector to Pump Disk in Slab Layers", Appl. Opt., vol. 15, No. 9, Sep. 1976.

Primary Examiner—Leon Scott, Jr.
Attorney, Agent, or Firm—Wigman & Cohen

[57] ABSTRACT

This invention relates to a multi-faceted reflector for use in pumping slab geometry solid state lasers. The present invention provides a multi-faceted reflector having a plurality of reflector segments which allow the reflector designer to alter the intensity profile along the longitudinal direction of the flashlamp without having to generate a continuous curve.

3 Claims, 4 Drawing Sheets (a)  (b)  (c)

(a)

(b)

RELATIVE INTENSITY

DISTANCE (Z)

MULTI-FACETED REFLECTOR FOR USE IN PUMPING SLAB GEOMETRY SOLID STATE LASERS

BACKGROUND OF THE INVENTION

1. Field of the Invention

This invention relates solid state lasers, and more particularly to multi-faceted reflectors for use in pumping slab geometry solid state lasers.

2. Description of the Prior Art

As a solid state laser medium there are known such media as a slab solid state laser medium (FIG. 1) and a rod geometry solid state laser medium (FIG. 2)

The slab geometry solid state laser medium is face pumped. The laser beam excited in the medium is reflected between the top and bottom surfaces, propagates the whole length of the medium, and is emitted from the end face. Therefore, the beam is free from thermally induced optical distortion along the thickness of the medium. Also an output beam emitted from the end surfaces of the slab has an improved quality over a rod geometry solid state laser.

The performance of the slab geometry solid state laser is, however, highly sensitive to the flashlamp pumping illumination distribution. In other words, the flashlamp intensity distribution directly affects the gain profile as well as the thermal energy distribution in the crystal volume. Therefore, reflector design must be carefully considered if the laser is to perform with a minimum of optical distortion. Nevertheless, the conventional reflector is made of a monolithic specular surface so that it is difficult to adjust optimally the illumination density to the laser medium in response to the form of the laser medium and other factors. Therefore, the problem exists that it is difficult to output a laser light with optimal profile.

SUMMARY OF THE INVENTION

An object of the present invention is to solve the above problem by providing a multi-faceted reflector which is capable of adjusting the illumination distribution to a slab geometry solid state laser medium in an optimal manner in response to the form of the medium and other factors, and hence, is capable of outputting a laser light with optimal profile.

Another object of the present invention is to provide a multi-faceted reflector which produces a uniform illumination in three dimensions of a slab geometry solid state laser medium.

Another object of the present invention is to provide a multi-faceted reflector which produces a uniform illumination in three dimensions of a slab geometry solid state laser medium, while minimizing the machining complexity of the medium.

Another object of the present invention is to provide a multi-faceted reflector which precludes nonuniformity of thermal energy in the laser medium volume, during oscillation of the laser.

Another object of the present invention is to provide a multi-faceted reflector which is capable of outputting a laser light with a minimum of optical distortion.

Another object of the present invention is to provide a multi-faceted reflector which possesses an increased design flexibility.

Another object of the present invention is to provide a multi-faceted reflector which allows the reflector designer to alter the intensity profile along the londgitudinal direction of the flashlamp without having to generate a continuous curve.

In order to achieve the above-mentioned objects, multi-faceted reflectors for use in pumping slab geometry solid state lasers have a plurality of reflector segments. When the intensity distribution of the direct light from the flashlamp to the laser medium is not uniform over the entire laser medium, the plurality of reflector segments are arranged with prescribed inclinations toward respectively the flashlamp and the laser medium so as to produce a substantially uniform total illumination, including the indirect light, to the laser medium over the entire laser medium.

These and other objects, features and advantages of the present invention will be more apparent from the following description of a preferred embodiment, taken in conjunction with the accompanying drawings.

DESCRIPTION OF THE PREFERRED EMBODIMENT

Figure 1:
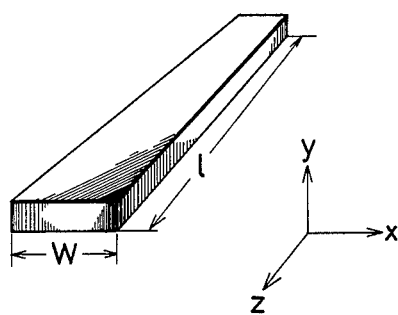
FIG. 1 and FIG. 2 are perspective views of the prior slab geometry laser medium and the rod geometry laser medium, respectively.
Figure 2:
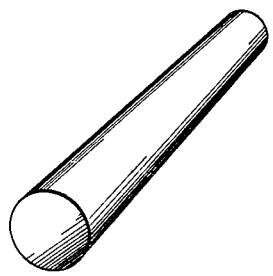
Figure 3:
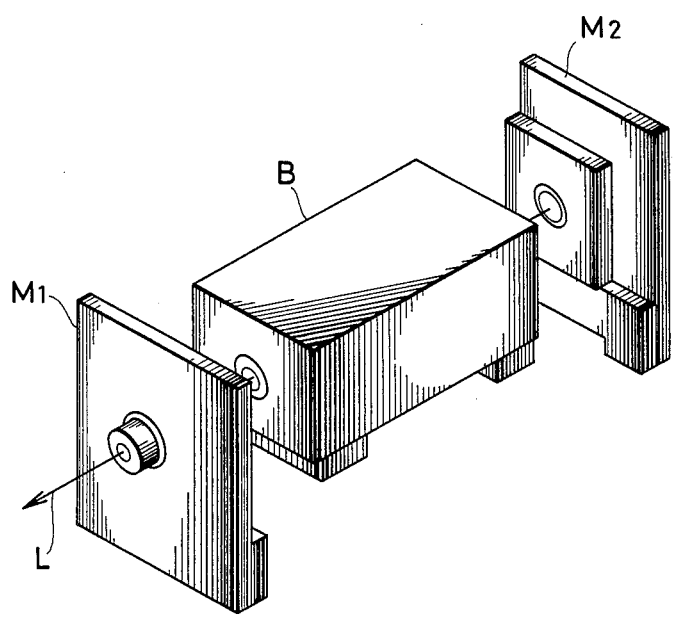
FIG. 3 is a perspective view of a solid state laser system equipped with a prior reflector and the embodiment of multi-faceted reflector of the present invention.

Referring to FIG. 3, the solid state laser system comprises a main body B and laser mirros M1, M2.

The main body B which comprises a solid state laser medium, flash lamp and reflector, (not shown) outputs the laser beam L from the output window which is provided at the both end faces of the main body B.

The reflector in the main body B is provided for reflecting the light emitted from the flash lamp uniformally radiate the solid state laser medium without loss of energy.

Figure 4:
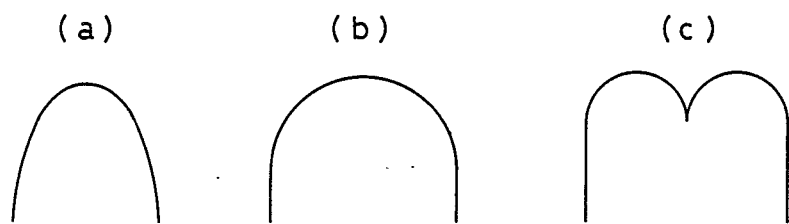
FIG. 4 is an explanatory diagram of the prior reflector curves for slab geometry laser pumping.

Referring to FIG. 4 conventional reflectors are based on curves such as a parabola (a), semicircle (b), and cusp (c). All of these curves can provide satisfactorily uniform illumination of the slab laser medium, if the dimensions of flashlamp, laser medium and reflector are properly chosen. However, in the general laser system, the dimensions of these are not properly chosen, and the reflector dimensions are usually strong functions of the flashlamp diameter. Therefore, often the reflector design is a compromise between the optimal design, flashlamp, or laser medium dimensions.

Additionally, most designs assume that a two dimensional design approach (in the x-y plane) is sufficient, since the three dimensional intensity distribution is simply an extension in the z direction of the two dimensional intensity distribution.

Figure 5:
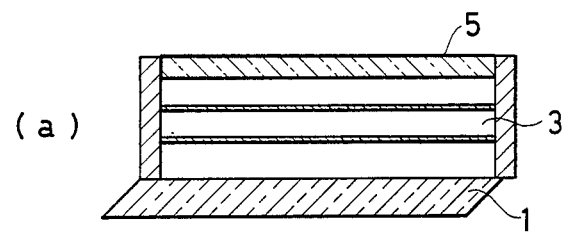
FIGS. 5(a) and 5(b) are explanatory diagrams for a laser device equipped with the prior reflector and its intensity variation along the z-direction, respectively.
Figure 5:
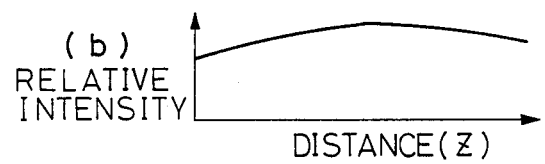

For example, as shown in FIG. 5(a), when there is arranged a flashlamp 3 which is arranged along the longitudinal (that is, z-axis) direction of a slab geometry laser medium 1, and a reflector 5 with a linear-form longitudinal cross-section is provided surrounding the flashlamp, the intensity of emission from the flashlamp is expected to be uniform over the longitudinal direction of the laser medium (Z-direction). However, as shown in FIG. 5(b), in reality the flashlamp intensity profile along the z-direction is not uniform, contrary to what might be expected.

This is due to a number of factors; for example, flashlamp length finiteness, or non-uniformity of flashlamp emissions along the length of the flashlamp.

Therefore, in the prior reflector, first there was a problem that if the dimensions of the flashlamp and the laser beam are not selected mutually optimal, then a uniform illumination to the slab laser medium becomes impossible and hence a laser light with optimal profile cannot be output. Secondly, further, there was a problem that it is not possible to output a laser light with optimal profile, since the illumination of the flashlamp along its length direction cannot be made uniform.

Now, a reflector according to the present invention will be described next.

The technique prescribed in this patent proposal consists of the use of a multi-segmented, multi-faceted reflector in order to produce uniform illumination in three dimensions to a slab geometry solid state laser medium. The facets and their relative placement can be tailored to the desired intensity distribution on the laser medium. Each facet is intended to be flat in order to minimize machining complexity, and any curve can be approximated by the use of these flat segments. The smaller the facets are made, the closer is the approximation to the desired curve.

Figure 6:
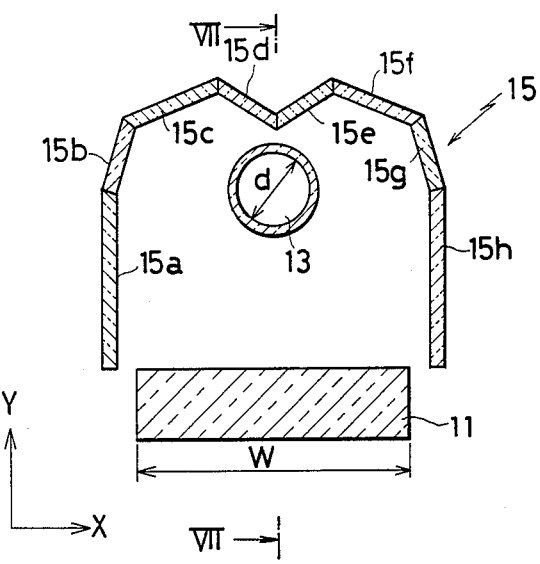
FIG. 6 is a sectional explanatory diagram for an embodiment of the multi-faceted reflector of the present invention.

FIG. 6 is an explanatory diagram showing a sectional view of the interior of a laser device that is equipped with an example of the multi-faceted reflector of the present invention. As shown in the figure, over a laser medium 11 with a prescribed width w there is provided a flashlamp 13 with a prescribed diameter d, and a multi-faceted reflector 15 that covers the flashlamp 13 and the top surface of the laser medium 11. The multi-faceted reflector 15 consists of a plurality of small mirrors 15a, 15b, 15c, 15d, 15e, 15f, 15g, and 15h which are arranged to form a cusp over the flashlamp 13 in the figure.

According to the present embodiment, a part of the radiation from the flashlamp 13 to the reflector 15 is reflected, separated by the cusp formed in the reflector 15. The light reflected from the cusp separated by it illuminates the edges of the laser medium 11 relatively strongly. Accordingly, the laser medium 11 is illuminated substantially uniformly over whole width w by the entirety of the emitted light, and hence a laser light with satisfactory profile can be output from the laser medium.

In addition, by arranging that the direction of the small mirrors 15a to 15h to be changeable to some extent, it becomes possible, when the diameter d of the flashlamp 13 and the width w of the laser medium 11 are altered, to illuminate the laser medium 11 uniformly all the time with the emission from the flashlamp 13 by changing the direction of the small mirrors 15a to 15h.

Figure 7:
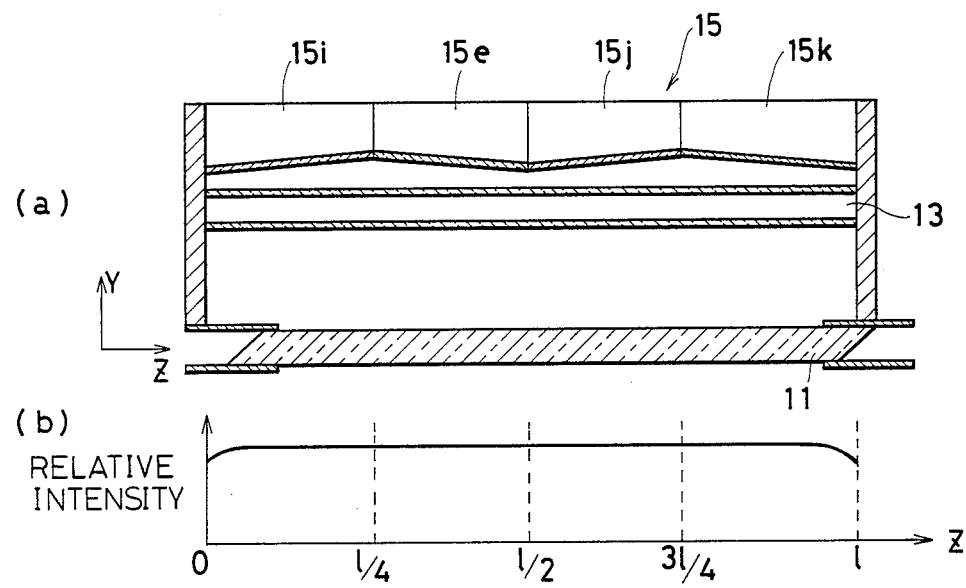
FIGS. 7(a) and 7(b) are longitudinal sectional explanatory diagram and the intensity variation along the longitudinal direction of the flashlamp, respectively, of the embodiment of the multi-faceted reflector of the present invention.

Next, referring to FIG. 7(a), the reflector structure may be segmented along the axis of the flashlamp (the z-direction) so that facets with appropriate angles with respect to the z-axis may be easily machined. The reason that the facets are to have a non-parallel orientation with respect to the z-axis is that it may be necessary to alter the intensity profile in the z-direction.

In the present embodiment, as illustrated in FIG. 7(b) with further reference to FIG. 7(a), the facets are formed in particular so as to be approximately a convex surface in the neighborhood of $z=1/2$ and approximately concave surfaces in the neighborhood of $z=1/4$ and $z=3\,1/4$, wherein l indicates the length of the slab geometry laser medium.

Therefore, the intensity distribution of the radiation emitted by the flashlamp over the width of the laser medium is enhanced to some extent in the neighborhood of $z=1/4$ and $z=3\,1/4$ compared with the light intensity distribution due to the conventional reflector shown in FIGS. 4(a), (b).

As a result, there can be obtained an intensity distribution which is substantially uniform over the entire length of the laser medium 11.

Further, by the above arrangements, it becomes possible to output a laser beam that possesses a more satisfactory profile than the prior device.

Moreover, the sectional form of the reflector along the longitudinal direction of the flashlamp could be arranged in various modes other than the mode shown in the above embodiment in response to the form, performance, and so on of the flashlamp, laser medium, and others.

Furthermore, by leaving the orientation with respect to the z-axis of the small mirrors 15i, 15e, 15j, and 15k that form the facets to be variable, it becomes possible to maintain an illumination distribution which is uniform all the time along the longitudinal direction of the laser medium through adjustment of the angles of these small mirrors, even when use is made of a flashlamp whose radiation distribution is nonuniform along its direction of length.

Although the invention has been described in its preferred embodiments, it is to be understood that various changes and modifications can be made within the purview of the appended claims without departing from the true scope and spirit of the invention in its broader aspects.

What is claimed is:

1. A multi-faceted reflector for use in pumping a slab geometry laser having a longitudinal slab geometry laser medium and a flashlamp for pumping light through said laser medium aligned with said laser medium in said longitudinal direction; wherein said reflector is divided at the midsection into two opposed end regions in the longitudinal direction, said reflector comprising small flat mirror segments which are arranged in a cross-section of the longitudinal direction so as to form cusp-shaped reflecting surfaces, said mirror segments being arranged in said longitudinal direction so that said reflecting surfaces of said mirror segments form a substantially concave shape near said end regions and wherein an intensity distribution of said light pumped through said laser medium is substantially uniform over the entire length of said slab laser medium.

2. The multi-faceted reflector as claimed in claim 1, in which said reflector is provided with means so as to be able to change its direction with respect to the flashlamp and the laser medium.

3. The multi-faceted reflector of claim 1, wherein a center of the concave surface along the longitudinal direction is substantially at a position seperated from each end of the flashlamp and the slab geometry laser medium by 1/4 where l is a whole length of the flashlamp and the slab geometry laser medium.

* * * * *